(12) United States Patent
Kinnavy et al.

(10) Patent No.: US 6,510,142 B1
(45) Date of Patent: Jan. 21, 2003

(54) METHOD AND APPARATUS FOR REDUCED REVERSED TRAFFIC IN A CELLULAR TELEPHONE SYSTEM

(75) Inventors: Michael J. Kinnavy, Park Ridge, IL (US); William Morgan, Elgin, IL (US); William P. Alberth, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/621,147

(22) Filed: Jul. 21, 2000

(51) Int. Cl.[7] ............................................. G08C 17/00
(52) U.S. Cl. ...................... 370/311; 455/13.4; 455/574
(58) Field of Search ................................ 370/329, 310, 370/311, 318, 320, 335, 342, 468, 328; 375/130, 135, 136, 146, 147, 297; 455/574, 575, 136, 138, 13.4, 572, 92, 127

(56) References Cited

U.S. PATENT DOCUMENTS

| | | | |
|---|---|---|---|
| 5,396,516 A | * 3/1995 | Padovani et al. | ............ 375/225 |
| 5,414,796 A | 5/1995 | Jacobs et al. | ................ 704/221 |
| 5,515,375 A | * 5/1996 | DeClerck | ..................... 370/468 |
| 5,896,411 A | * 4/1999 | Ali et al. | ...................... 375/230 |
| 5,898,696 A | * 4/1999 | Proctor et al. | .............. 370/468 |
| 5,933,781 A | * 8/1999 | Willenegger et al. | ........ 455/522 |
| 6,141,353 A | * 10/2000 | Li | .............................. 370/465 |
| 6,272,123 B1 | * 8/2001 | Abe | ........................... 370/342 |

* cited by examiner

Primary Examiner—Douglas Olms
Assistant Examiner—Phirin Sam
(74) Attorney, Agent, or Firm—Paul J. Bartusiak; Randall S. Vaas

(57) ABSTRACT

A code division multiple access (CDMA) cellular telephone with reduced transmissions from the CDMA cellular telephone to a remote base station. A variable rate vocoder is operable to receive an input signal and encode the input signal at any of a plurality of frame rates responsive to an amount of audio content present in the input signal. A controller monitors an encoding rate of operation of the variable rate vocoder and detects when the variable rate vocoder operates at a predetermined rate. The controller then causes a transmitter coupled to the variable rate vocoder to reduces a duty cycle of operation.

33 Claims, 3 Drawing Sheets

METHOD AND APPARATUS FOR REDUCED REVERSED TRAFFIC IN A CELLULAR TELEPHONE SYSTEM

FIELD OF THE INVENTION

This invention generally relates to reducing power consumption in portable radiotelephones. More specifically, this invention relates to an apparatus and method for reducing cellular telephone transmissions when a variable rate vocoder operates at a minimum encoding rate.

BACKGROUND OF THE INVENTION

In digital cellular telephone systems, such as code division multiple access (CDMA) cellular systems or time division multiple access (TDMA) cellular systems, a users speech input to a cellular telephone is digitized. Since cellular frequency spectrum is a valuable commodity, compression techniques are employed to reduce the data rate (and therefore the amount of information) necessary to transmit the digitized speech over the cellular airwaves. The digital circuitry used to accomplish at least some of the compression is generally referred to as a vocoder.

A vocoder analyzes an input speech in blocks of time (commonly referred to as frames) and encodes the input using certain vocoder parameters. The vocoder parameters are calculated for each frame. One class of speech coders includes Code Excited Linear Predictive Coding (CELP), Stochastic Coding, and Vector Excited Speech Coding. As an example of the vocoder parameters, in a CELP vocoder, the parameters relate to a Linear Predictive Coding (LPC) filter, a pitch filter, and waveform excitation.

To compress the digitized speech even further, a technique referred to as variable rate vocoding is employed. Variable rate vocoding reduces the data rate for periods of silence in the input speech signal to produce a variable output data (frame) rate.

The use of a variable rate vocoder in the cellular telephone (also referred to as a mobile station) reduces the amount of data that the cellular telephone transmits to increase channel capacity. However, even for encoded frames of the input speech where there is no audio content (e.g. periods of silence), the cellular telephone still transmits the encoded signal. This causes the cellular telephone to use valuable DC battery power more than is necessary. This excessive use of battery power in turn reduces the available talk time for a cellular telephone for any given battery charge. Therefore, there is a need for an apparatus and method to reduce power consumption in a cellular telephone that employs a variable rate vocoder.

DETAILED DESCRIPTION OF PREFERRED EMBODIMENTS

Figure 1:
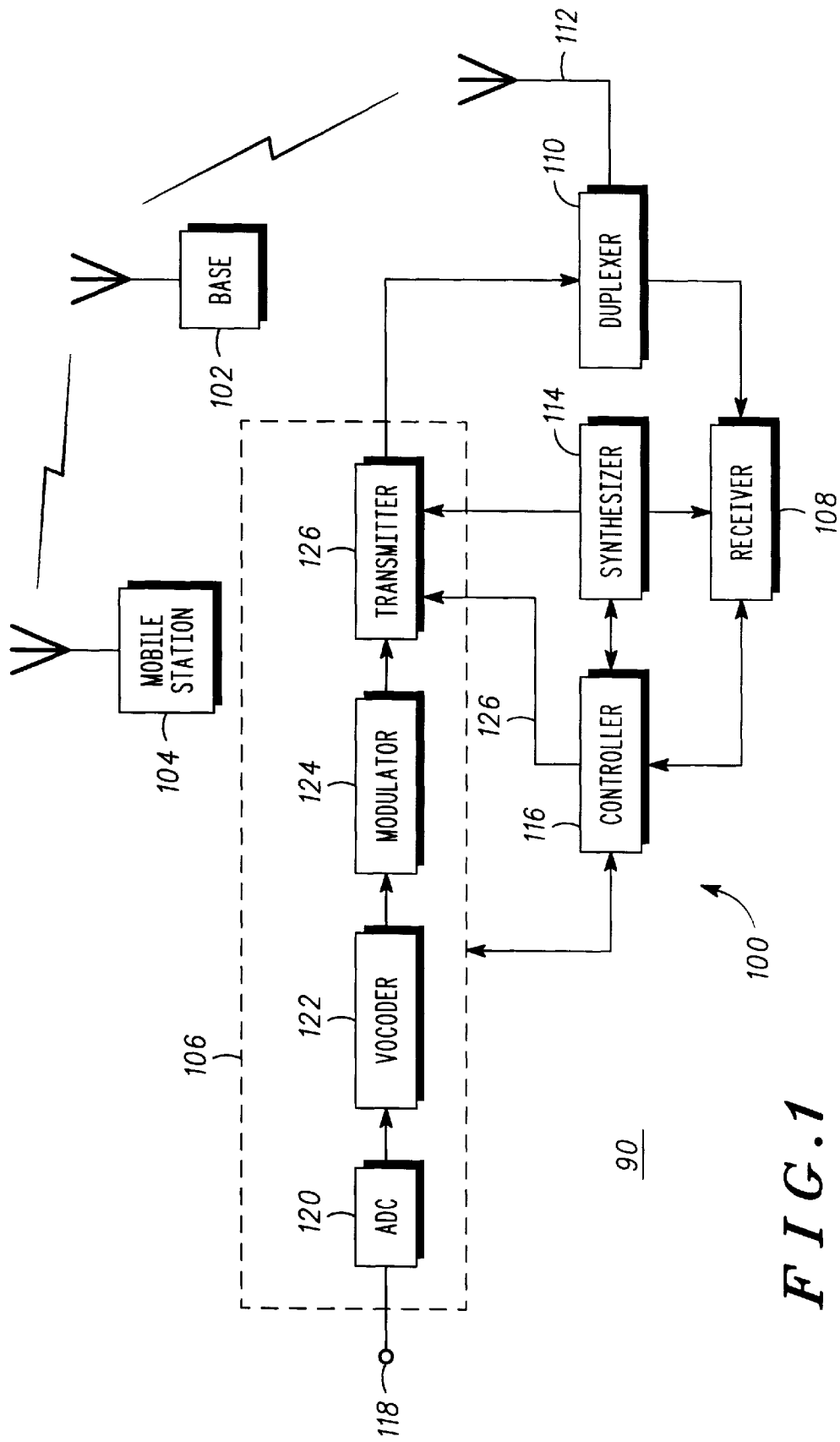
FIG. 1 is a block diagram of a cellular telephone system, including a cellular telephone, in accordance with the present invention.

FIG. 1 is a block diagram of a cellular telephone system 90 in accordance with the present invention. A first cellular telephone 100 is in signal communication with a remote base station 102. FIG. 1 shows a second mobile station 104 concurrently communicating with the remote base station 102. In the illustrated embodiment, the cellular telephone system 90 operates via a multiple access technique referred to as code division multiple access (CDMA). Other multiple access techniques, such as time division multiple access (TDMA) or a combination of TDMA and CDMA, can be employed so long as a variable rate vocoder is utilized in the cellular telephone units.

The cellular telephone 100 includes a transmitter lineup 106 coupled through duplexer 110 to an antenna 112. A conventional receiver 108 is also coupled to the antenna 112 through the duplexer 110. The duplexer 110 provides isolation between the transmit signals and receive signals as is know in the art. For cellular systems that do not employ full duplex operation, the duplexer 110 is not needed.

A conventional synthesizer 114 generates reference signals and radio frequency signals for the transmission and reception of cellular telephone signals. The controller 116 is for control of the functions of the cellular telephone 100. The controller comprises any of a microprocessor, a microcontroller, a digital signal processor (DSP), and various digital logic circuitry. All line connections between the components are not shown so as not to unduly complicate the drawing figure. In addition, various cellular telephone components, such as the microphone, speaker, and keyboard are not shown so as to not unduly complicate the drawing figure.

The transmitter lineup 106 is for receiving user input information and transmitting the information to the base station 102. The transmitter lineup 106 generally includes analog-to-digital conversion circuitry 120, a variable rate vocoder 122, a modulator 124, and a transmitter 126.

Input speech signals from a user that appear at input port 118 are directed to the analog-to-digital conversion circuitry 120 where the input is digitized as is known in the art. The digitized speech signal is coupled to the variable rate vocoder 122 where it is encoded at any of a plurality of different frame rates depending upon the audio content in the speech signal. In the illustrated embodiment, the variable rate vocoder 122 implements the CELP coding technique to provide a variable rate in coded speech data.

The encoded signal is coupled to the conventional modulator 124 to convert the digital input symbols into waveforms that are compatible with the transmission channel. In the illustrated embodiment, the modulator 124 employs phase shift keying (PSK) as is know in the art. Other modulation techniques, such as minimum shift keying (MSK) or quadrature amplitude modulation (QAM) can be employed.

The modulated signal is processed by the transmitter 126 to further prepare the input information for transmission. The transmitter 126 includes conventional components such as up-conversion circuitry (mixers), filters, gain control circuitry, and a power amplifier.

For the various vocoder frame rates of operation, each frame is comprised of 160 samples, or 20 msec. of speech, at an 8 KHz sampling rate. Other sampling rates and frame sizes can be employed. Further, in the illustrated embodiment, the variable rate vocoder 122 FIG. 1 is operable to encode frames of information at a plurality of different frame rates. At a first rate, referred to as a full rate, data transmission is at an 8.55 Kbps rate. A second rate is referred to as a half rate, and data transmission is at a 4 Kbps rate. A third rate is referred to as a quarter rate, and data transmission is at a 2 Kbps rate. Finally, a fourth rate referred to as eighth rate, data transmission is just less than 1 Kbps. The cellular telephone standards described in standards documents TIA/EIA-IS-95-A, TIA/EIA-IS-95-B, and TIA/EIA-TSB2000 allow for variable rate vocoding with the rates just described, and each of these standards are incorporated herein by reference.

Statistics show that most often in cellular systems the variable rate vocoder 122 operates most often at the full rate and the eighth rate encoding rates. Variable rate vocoding at the eighth rate is primarily used where there is no audio content represented in the input speech signal. This occurs, for example, when the user is not talking into the cellular telephone 100. This can result from the user listening to someone else speaking to the user for significant periods of time. This can also occur when the user calls into a conference type call and is primarily listening to other callers speak during the conference call, when the user is listening to voice mail, or when the user is listening to broadcast channel services. The user can also cause the variable rate vocoder to begin vocoding at the eighth rate by hitting a mute button (not shown) on the cellular telephone 100.

Thus, there is generally little or no real information/audio content present in the input signal when the variable rate vocoder 122 is operating at the eighth rate. The input signal to the vocoder is still encoded, but that particular 20 msec frame of information has no meaningful content and serves mainly as a place holder. Therefore, the cellular telephone 100 wastes battery power by having the transmitter 126 process the eighth rate vocoded frame for transmission.

Thus, in the illustrated embodiment the controller 116 is coupled to the variable rate vocoder 122 and detects the encoding rate of the variable rate vocoder. When the controller 116 detects a decrease in the encoding rate to a predetermined rate, here the minimum encoding rate (e.g. the eighth rate), the controller generates a message request to enter a reduced transmission mode that is coupled to the transmitter lineup 106 for transmission to the base station 102. In accordance with the IS-95 cellular telephone standard, the message request is sent as an Order message via a traffic channel. Alternatively, a dedicated control channel (DCCH) via the EIA/TIA IS-2000 CDMA standard, incorporated herein by reference, can be used to send the message.

The Order message is defined in the cellular standard and it is made up of multiple fields. One such field is an acknowledgement required field (also referred to as an Ack Required field). When the cellular telephone 100 sends a request to enter the reduced transmission mode, the Ack Required field is set to one to indicate to the base station 102 that the cellular telephone 100 requires the base station 102 to acknowledge the cellular telephone request.

When the receiver 108 of the cellular telephone 100 receives a reduced transmission mode acknowledgement from the base station 102, the controller 116 causes the transmitter 126 to reduce a transmit duty cycle of operation to cause the cellular telephone to operate in a reduced transmission mode. In this mode, the transmitter 126 reduces its duty cycle of operation. This can be explained more clearly with reference to FIG. 2.

Figure 2:
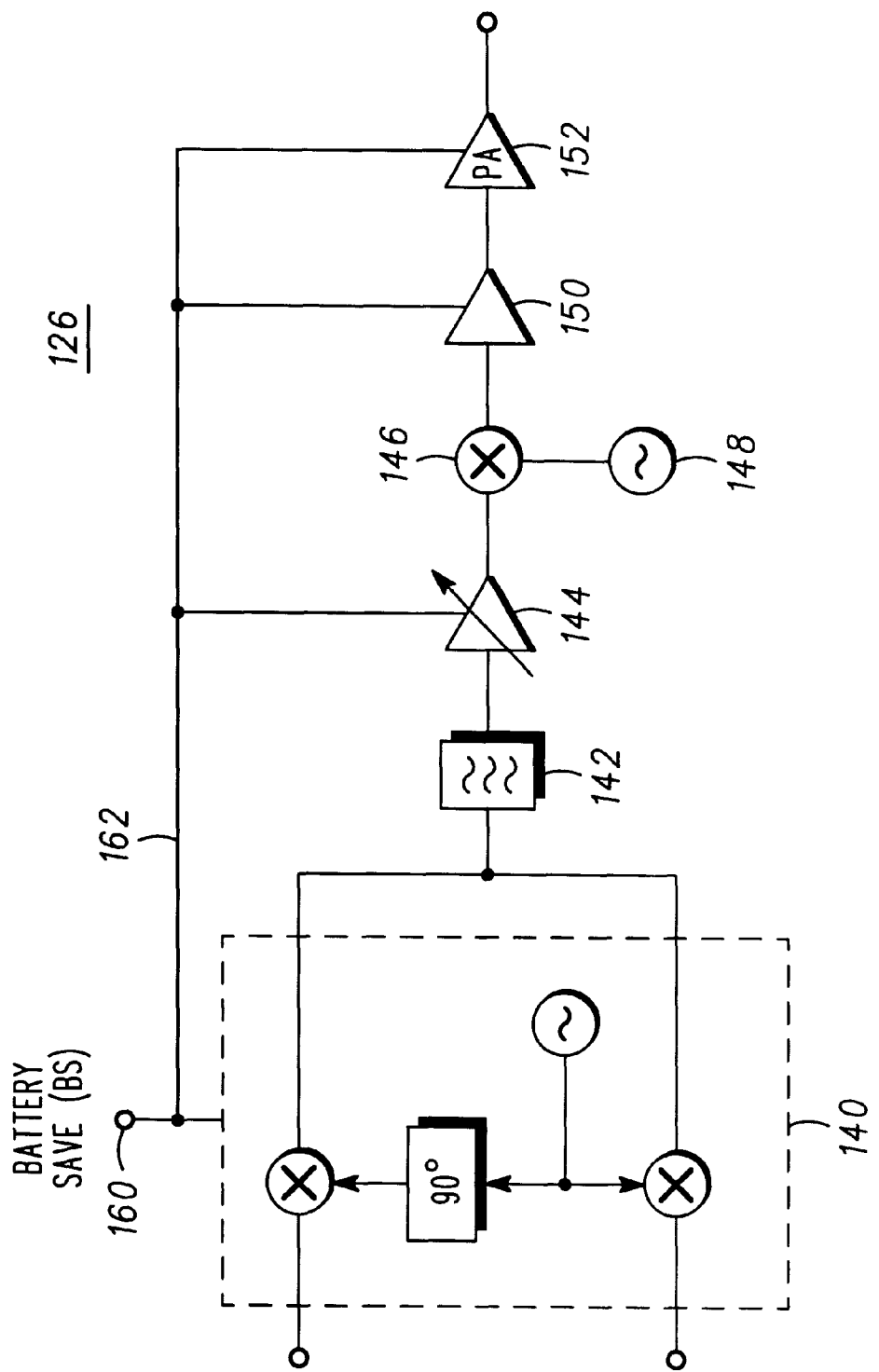
FIG. 2 is a block diagram of the transmitter of the cellular telephone of FIG. 1.

FIG. 2 is a block diagram of the transmitter 126 of FIG. 1. The elements shown in FIG. 2 is only one example embodiment of the transmitter 126, and it will be obvious to those skilled in the art that other transmitter lineups with additional passive and active components can be used without the use of the inventive capacity.

The transmitter 126 generally includes an IQ modulator 140 for receiving digitally modulated input signals. After IQ modulation the signal is coupled to a bandpass filter 142 to filter out mixing, intermodulation, and spurious components resulting from the IQ modulation. The filtered signal is applied to the variable gain amplifier (VGA) 144 for gain control as is known in the art. The gain control is thus for either increasing or decreasing the amplitude of the modulated information signal. If the cellular telephone 100 is closer to the base station 102, then the gain of the VGA 144 is decreased. The gain adjusted signal is then applied to upconversion mixer 146 for conversion to a radio frequency channel for transmission. RF oscillator 148 couples the RF carrier signal to the upconversion mixer 146 for the upconversion process as is known in the art. The upconverted signal is applied to RF amplifier 150 for further amplification. Finally, the amplified signal is applied to the power amplifier 152 for final power amplification.

As shown in FIG. 2, various components of the transmitter 126 are coupled together via line 162. This is for carrying a battery save signal present at the battery save input 160 to the various components of the transmitter. When the cellular telephone 100 receives an acknowledgement from the base station 102 to enter the reduced transmission mode, the controller 116 changes the battery save signal (also referred to as a battery save bit) from asserted low to asserted high. Changing the battery save bit to asserted high causes a reduction in power to various components of the transmitter 126.

Figure 3:
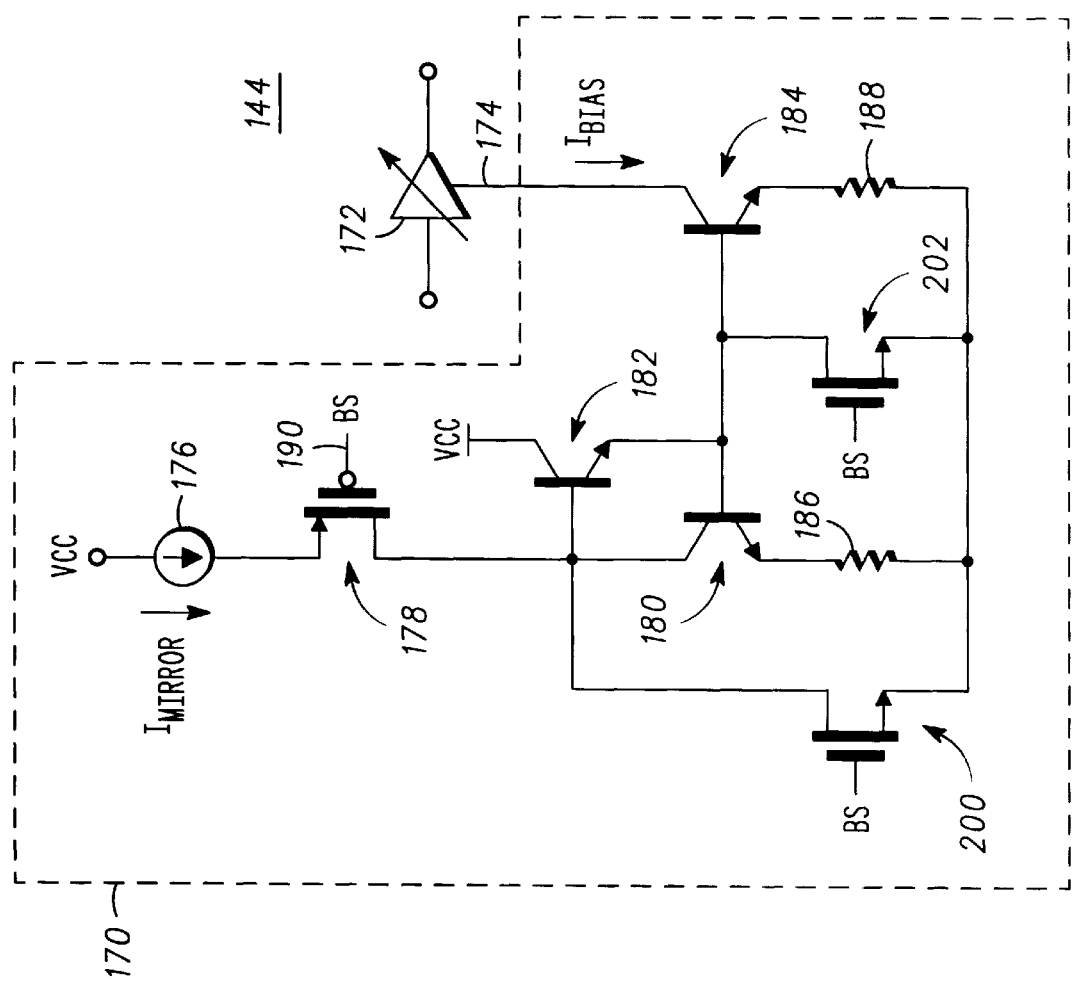
FIG. 3 shows a partial schematic diagram and partial block diagram of a variable gain amplifier of the transmitter of FIG. 2.

The reduction in power for any particular transmitter component can be accomplished via many different ways. For example, the line 162 couples the battery save bit to the VGA 144. FIG. 3 shows a partial schematic diagram and partial block diagram of the VGA 144. In FIG. 3, bias circuitry 170 is coupled to a variable gain amplifier circuit 172. The bias circuit 170 is used to provide bias current to power the VGA circuit 172 via line 174. The bias current present on line 174 is a current mirrored from current source 176 using conventional transistor current mirror techniques. In the illustrated embodiment, the current source 176 represents a reference current source to bias the VGA circuit 172. The current source is coupled through a P-channel MOSFET transistor 178 to a collector terminal of bipolar junction transistor (BJT) 180. The collector terminal of BJT 180 is also coupled through BJT 182 to the base terminal of BJT 180. The base terminal of BJT 184 is coupled to the base terminal of BJT 180. Depending upon the transistor size ratio between BJT 180 and BJT 184, and depending upon the resistor ratio between resistor 186 and resistor 188, the bias current present on line 174 is proportional to the current produced by current source 176 as is known in the art.

The gate terminal 190 of the P-channel MOSFET 178 is coupled to receive the battery save bit and acts as a switch. When the battery save bit is asserted high, the P-channel MOSFET 178 acts as an open circuit and no reference current is generated. Therefore, when the battery save bit is asserted high, the VGA circuit 172 does not consume current.

To prevent any leakage current, N-channel MOSFET 200 acts as a switch and couples the collector terminal of BJT 180 to ground, and N-channel MOSFET 202 couples the base terminals of BJT 180 and 184 to ground. When the battery save signal is asserted high, N-channel MOSFETS 200 and 202 act as short circuits to further turn off BJTs 180 and 184.

Similar battery save techniques cause other transmitter 126 (FIGS. 1 and 2) components to reduce power consumption responsive to a battery save signal being asserted high. It will be obvious to those skilled in the art that other battery save circuitry can be used to reduce power consumption in transmitter components responsive to a battery save signal. For example, a MOSFET channel transistor can be coupled between a DC supply voltage and a supply terminal of a transmitter component. When the battery save signal is asserted high, the MOSFET acts as an open circuit so that DC power does not reach the supply terminal of the transmitter component.

Thus, when the cellular telephone 100 enters the reduced transmission mode, the transmitter 126 reduces its duty cycle of operation. This occurs when the controller 116 (FIG. 1) detects the variable rate vocoder operating at the eighth frame rate. The reduced duty cycle of operation comprises the transmitter 126 reducing power consumption by its various transmitter components through techniques already previously described. In the illustrated embodiment, the reduced duty cycle of operation means that the transmitter 126 reduces the power to the various transmitter components every other 20 msec frame while the variable rate vocoder 122 encodes at the eighth frame rate. Thus, the transmitter 126 reduces its duty cycle of operation from a first duty cycle of operation (e.g. 100% where the transmitter is powered to operate for every 20 msec vocoder frame) to a second, reduced duty cycle of operation of substantially 50%. Other reduced duty cycles can alternatively be employed (e.g. not transmitting for every third eighth rate frame during operation in the reduced transmission mode).

When the cellular telephone 100 operates in the reduced transmission mode, the base station 102 must also alter the base station 102 manner of operation. This is because for each frame in which the cellular telephone 100 does not transmit (e.g. for each 20 msec frame that the cellular telephone 100 reduces its power consumption), the cellular telephone essentially transmits what is commonly referred to as an erasure. An erasure typically results from poor signal propagation conditions. For example, when the cellular telephone 100 moves behind a tall building, the signal it transmits to the base station 102 is blocked. The base station 102 detects this as an erasure.

Thus, when the cellular telephone 100 operates in the reduced transmission mode, it produces erasures that are not a result of deteriorated signal conditions; the erasures are essentially purposeful erasures. In that instance, the base station 102 treats the erasures as expected erasures rather than as erasures resulting from signal propagation conditions. For example, the base station 102 operates using a power control algorithm. The base station receives a signal from the cellular telephone 100 and alters either its own transmit power or sends a command to the cellular telephone 100 to reduce the cellular telephone 100 transmit power depending upon the level of the signal the base station 102 receives from the cellular telephone 100 and/or depending upon whether the base station 102 detects an erasure. Thus, if the cellular telephone 100 is operating in the reduced transmission mode, the base station 102 will detect erasure and otherwise instruct the cellular telephone 100 to increase its transmit power. However, in the illustrated embodiment, the base station power control algorithm comprises a first power control algorithm and a second power control algorithm.

When the cellular telephone 100 is not operating in the reduced transmission mode, the base station 102 operates via the first, conventional power control algorithm. When the cellular telephone 100 is operating in the reduced transmission mode, the base station 102 operates via the second power control algorithm. In the second power control algorithm, the base station 102 ignores erasures and instead uses a frame of data preceding each particular erasure for power control calculations and analysis.

Thus, when the base station 102 detects an erasure indication during operating via the second power control algorithm, the base station 102 just uses whatever the last frame of information was prior to that particular erasure. Thus, one input to the power control algorithm is frame rate, and during operation in the reduced transmission mode, instead of the base station 102 receiving an indication of frames of ⅛th, ⅛th, ⅛th, it's going to receive an indication of ⅛th, ⅛th erasure, ⅛th, etc. The base station 102 just ignore the erasure indication and uses the just previous 20 msec frame of data.

Still further, when the cellular telephone 100 operates in the reduced transmission mode, the base station 102 must alter the base station 102 manner of operation in yet another way. Particularly, while the base station 102 is in signal communication with the cellular telephone 100, the base station performs a dropped call analysis. For example, normally if the base station 102 detects a predetermined number of erasure indications in a predetermined amount of time, the base station assumes that the signal connection with the cellular telephone 100 has been disconnected (e.g. a dropped call has occurred). In the altered manner of operation, however, the base station 102 does not include in its drop call analysis erasures that it detects during operation in the reduced transmission mode.

In the preferred embodiment, when the variable rate vocoder 122 (FIG. 1) changes (e.g. increases) from the eighth rate encoding rate to a new, higher encoding rate, the controller 116 (FIG. 1) detects this change. The controller 116 then causes the transmitter 126 (FIG. 1) to suspend operation in the reduced transmission mode.

The base station 102 utilizes a rate determination algorithm and would thus detect the cellular telephone 100 change in the encoding rate by detecting cellular telephone 100 transmissions of two consecutive frames resulting from an encoding frame rate different than the eighth rate. The base station would accordingly alter its manner of operation to treat received erasures as erasures due to poor/deteriorated signal conditions rather than expected erasures. Alternatively, the cellular telephone 100 can send a special message to the base station 102 to inform the base station 102 of the cellular telephone exiting the reduced transmission mode and of the cellular telephone correspondingly increasing its duty cycle of operation.

Still further, in an alternate embodiment the base station 102 sends a message to the cellular telephone 100 ordering the cellular telephone 100 to suspend operation in the reduced transmission mode. The base station 102 does this under conditions such as if the base station detects that the quality of a received signal has degraded as a result of the cellular telephone 100 being on the fringe of the base station 102 cell site. Other conditions are if there are high fading rates or if other system parameters have changed since the cellular telephone 100 was approved to operate via the reduced transmission mode.

By operating in the reduced transmission mode, the cellular telephone saves battery power to increase the available talk time for the cellular telephone. For example, for a 7 dBm cellular telephone output power and a voice activity factor (VAF) of 40% (e.g. a typical voice call), there is an approximate 3% saving in cellular telephone current consumption. Further, when the cellular telephone output power is 23 dBm and the VAF is 40% (representing a call on the outer perimeter of a base station cell), there is a current saving of approximately 6.5%. Still further, when the output power is 23 dBm and the variable rate vocoder output data is all ⅛ rate frames, (e.g. the cellular telephone is downloading a file or muted), there is a current consumption reduction of approximately 50%.

The previous three current savings examples corresponded to the cellular telephone operating via what is commonly referred to as rate set 1 or 2 for either the IS-95 A or IS-95 B standard. When the cellular telephone is operating via a rate set 3 in what is referred to as IS-2000 (e.g. wherein the cellular telephone transmits a reverse link pilot signal), there is also a savings in power consumption. For example, when the cellular telephone is transmitting at 23 dBm output power and all ⅛ rate frames, there is an approximately 10% power consumption operation when operating in the reduced transmission mode.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty.

We claim:

1. In a radiotelephone operable to encode frames of information at a plurality of different rates, a method of reducing transmissions from the radiotelephone to a remote base station, the method comprising:
   detecting a decrease in an encoding rate;
   sending a request to the remote base station to enter a reduced transmission mode responsive to detecting; and
   reducing a transmit duty cycle of the radiotelephone to enter the reduced transmission mode.

2. The method of claim 1 wherein the radiotelephone is operable in a code division multiple access (CDMA) cellular telephone system.

3. The method of claim 2 further comprising receiving a reduced transmission mode acknowledgement from the remote base station, wherein the radiotelephone reduces the transmit duty cycle responsive to receiving the reduced transmission mode acknowledgement.

4. The method of claim 2 wherein the encoding rate comprises a rate of encoding digitized speech.

5. The method of claim 4 further comprising:
   determining a level of speech activity; and
   decreasing the encoding rate responsive to the level of speech activity.

6. The method of claim 1 wherein the step of detecting comprises detecting a current encoding rate of operation of one-eighth frame rate.

7. The method of claim 1 further comprising:
   receiving an order to suspend operation in the reduced a transmission mode; and
   increasing the transmit duty cycle responsive to receiving the order.

8. The method of claim 1 wherein the step of detecting comprises the radiotelephone operating at a minimum encoding rate among the plurality of different rates.

9. The method of claim 1 further comprising notifying of an intent to suspend operation in the reduced transmission mode.

10. The method of claim 1 wherein reducing the transmit duty cycle comprises any of:
    periodically disabling at least a portion of transmitter circuitry in the radiotelephone, and
    periodically reducing an amount of DC power applied to the at least a portion of the transmitter circuitry.

11. In a code division multiple access (CDMA) radiotelephone capable of encoding frames of information at a plurality of different rates, a method of reducing an amount of transmissions from the CDMA radiotelephone to a remote base station, the method comprising:
    detecting a decrease in an encoding rate;
    sending a request to the remote base station to enter a reduced transmission mode;
    receiving a reduced transmission mode acknowledgement from the remote base station; and
    reducing a transmit duty cycle of the CDMA radiotelephone to operate in the reduced transmission mode.

12. The method of claim 11 wherein reducing the transmit duty cycle comprises decreasing the transmit duty cycle of the CDMA radiotelephone by substantially fifty-percent from a current duty cycle of operation.

13. The method of claim 11 wherein the step of detecting comprises the CDMA radiotelephone operating at a minimum encoding rate among the plurality of different rates.

14. The method of claim 13, wherein the CDMA radiotelephone is operable to encode information at a full rate, a half-rate, a quarter-rate, and an eighth rate, and wherein detecting the decrease in the encoding rate comprises detecting operation at the eighth rate.

15. The method of claim 11 further comprising transmitting a message to exit the reduced transmission mode.

16. The method of claim 11 further comprising:
    transmitting signals to the remote base station during operation in the reduced transmission mode, the signals including erasures resulting from operation in the reduced transmission mode;
    receiving the signals at the remote base station; and
    treating, responsive to receiving the signals, the erasures as expected erasures rather than erasures resulting from signal propagation conditions.

17. The method of claim 16 wherein the remote base station operates via a first power control algorithm when the CDMA radiotelephone is not operating in the reduced transmission mode, and the remote base station operates via a second power control algorithm when the CDMA radiotelephone is operating in the reduced transmission mode, wherein the step of treating comprises:
    ignoring the erasures while using the second power control algorithm; and
    using a frame of data preceding an erasure for power control calculations during use of the second power control algorithm.

18. The method of claim 17 wherein the step of treating further comprises the remote base station not including in a drop call analysis detected erasures detected during operation in the reduced transmission mode.

19. The method of claim 11 further comprising:
    exiting the reduced transmission mode; and
    detecting at the remote base station an exit from the reduced transmission mode.

20. The method of claim 11 further comprising:
    exiting from the reduced transmission mode; and
    notifying the remote base station of an exit from the reduced transmission mode.

21. The method of claim 11 wherein reducing the transmit duty cycle comprises any of:

periodically disabling at least a portion of CDMA radiotelephone transmitter circuitry, and periodically reducing an amount of DC power applied to the at least a portion of the CDMA radiotelephone transmitter circuitry.

22. In a code division multiple access (CDMA) cellular telephone, an apparatus for reducing an amount of cellular telephone transmissions, the apparatus characterized by:

a vocoder for receiving an input signal and encoding the input signal at any of a plurality of frame rates responsive to an amount of audio content in the input signal;

a transmitter for transmitting signals to a remote location; and a controller coupled to the vocoder and the transmitter, the controller for detecting when the vocoder encodes the input signal at a predetermined rate, the transmitter to reduce a duty cycle of operation responsive to the vocoder detecting operation at the predetermined rate, the predetermined rate comprises a minimum encoding rate among the plurality of frame rates; and wherein the transmitter is operable to send a reduced transmission mode request to a remote base station responsive to the vocoder detecting operation at the predetermined rate.

23. The apparatus of claim 22 wherein the transmitter is operable to reduce the duty cycle of operation responsive to the CDMA cellular telephone receiving an acknowledgement message from the remote base station to operate in a reduced transmission mode.

24. The apparatus of claim 23 wherein reducing the duty cycle of operation comprises any of:

periodically disabling at least a portion of circuitry of the transmitter, and periodically reducing an amount of DC power applied to the at least a portion of the circuitry.

25. A code division multiple access (CDMA) cellular telephone system comprising:

a mobile station including,
   a vocoder for receiving an input signal and encoding the input signal at any of a plurality of frame rates responsive to an amount of audio content in the input signal,
   a mobile station transmitter coupled to the vocoder, and
   a mobile station controller for detecting an encoding rate of thee vocoder and producing an indication of the vocoder operating at a predetermined rate, wherein the transmitter transmits a reduced transmission mode request responsive to the indication, and a base station including,
   a base station receiver for receiving the reduced transmission mode request, and
   a base station transmitter for transmitting an acknowledgement of the reduced transmission mode request,
wherein the mobile station transmitter reduces a duty cycle of operation responsive to receiving the acknowledgement.

26. The CDMA cellular telephone system of claim 25 wherein reducing the duty cycle of operation comprises any of:

periodically disabling at least a portion of the mobile station transmitter, and periodically reducing an amount of DC power applied to the at least a portion of the mobile station transmitter.

27. The CDMA cellular telephone system of claim 25 wherein the base station further comprises power control circuitry coupled to the base station transmitter, the power control circuitry operable via a first power control algorithm and a second power control algorithm, wherein the power control circuitry operates via the second power control algorithm responsive to transmitting the acknowledgement of the reduced transmission mode request.

28. The CDMA cellular telephone system of claim 27 wherein when the mobile station transmitter reduces the duty cycle of operation, the base station ignores erasure indications resulting from mobile station transmissions.

29. The CDMA cellular telephone system of claim 28 wherein when the mobile station transmitter reduces the duty cycle of operation, the base station does not consider the erasure indications in a dropped call analysis.

30. The CDMA cellular telephone system of claim 28 wherein the power control circuitry does not use the erasure indications during operation via the second power control algorithm.

31. The CDMA cellular telephone system of claim 30 wherein during operation via the second power control algorithm, a frame of information preceding a particular erasure frame is used for a power control calculation corresponding to the particular erasure frame.

32. The CDMA cellular telephone system as in claim 25 further comprising a base station controller coupled to the base station receiver and for detecting an indication that the mobile station transmitter has suspended operating at a reduced duty cycle.

33. The CDMA cellular telephone system of claim 32 wherein the indication comprises any of:

a mobile station transmission of two consecutive frames resulting from an encoding frame rate different than the predetermined rate; and a message transmitted by the mobile station.

* * * * *